United States Patent [19]

Duffee et al.

[11] Patent Number: 5,716,054
[45] Date of Patent: Feb. 10, 1998

[54] DIAMETRIC PLANE SPLIT MECHANICAL FACE SEAL

[75] Inventors: Henry S. Duffee, Florence; Denise M. Ard, Latta, both of S.C.

[73] Assignee: BW/IP International, Inc., Long Beach, Calif.

[21] Appl. No.: 745,412

[22] Filed: Nov. 25, 1996

Related U.S. Application Data

[63] Continuation of Ser. No. 374,325, Jan. 18, 1995, abandoned.

[51] Int. Cl.$^6$ ................................................ F16J 15/38
[52] U.S. Cl. ........................ 277/81 S; 277/81 R; 277/92
[58] Field of Search ............................ 277/38, 39, 81 S, 277/81 R, 9, 85, 193, 197, 192

[56] References Cited

U.S. PATENT DOCUMENTS

| | | |
|---|---|---|
| 281,760 | 7/1883 | Gingras . |
| 766,882 | 8/1904 | Hart . |
| 1,398,439 | 11/1921 | McMaster . |
| 1,833,887 | 12/1931 | Andrews . |
| 2,768,036 | 10/1956 | Greenough . |
| 3,245,693 | 4/1966 | Way . |
| 3,288,164 | 11/1966 | Clark . |
| 3,580,765 | 5/1971 | Grove . |
| 4,251,083 | 2/1981 | Montes . |
| 4,290,615 | 9/1981 | Etcheverry . |
| 4,327,921 | 5/1982 | Reinsma et al. ............. 277/85 |
| 4,415,164 | 11/1983 | Johnson ..................... 277/81 R |
| 4,538,820 | 9/1985 | Duffee ....................... 277/11 |
| 4,568,091 | 2/1986 | Harrison .................... 277/197 |
| 4,576,384 | 3/1986 | Azibert ...................... 277/81 |
| 5,067,733 | 11/1991 | Nagai et al. ................ 277/11 |
| 5,114,163 | 5/1992 | Radosav et al. ............ 277/85 |
| 5,192,085 | 3/1993 | McOnie . |
| 5,201,431 | 4/1993 | Lai . |
| 5,294,132 | 3/1994 | Duffee et al. ............... 277/9.5 |

FOREIGN PATENT DOCUMENTS

| | | | |
|---|---|---|---|
| 207706 | 9/1966 | Sweden . | |
| 141704 | 3/1961 | U.S.S.R. . | |
| 715872 | 2/1980 | U.S.S.R. ............. | 277/81 S |
| 1809890 | 4/1993 | U.S.S.R. . | |
| 1142327 | 2/1969 | United Kingdom ..... | 277/81 S |

Primary Examiner—Daniel G. DePumpo
Attorney, Agent, or Firm—Pretty, Schroeder & Poplawski

[57] ABSTRACT

A shaft seal of the mechanical face seal type split along a diametric plane thereof and which therefore can be installed relative to a shaft without disassembly of attendant equipment. The stationary and rotating components of the seal each may have the half elements thereof assembled in corresponding half elements of an attendant split annular holder and the holder half elements then may be engaged about the attendant shaft and be secured together. Thereafter, the assembled holders may be relatively axially shifted along the shaft toward engagement with each other and mounted in operative association with each other within a diametrically split gland housing, all of which relative assembly of the split stationary and rotating seal components in the corresponding split holder, assembly of the holders about the shaft and assembly of the assembled holders within the gland housing halves may be carried out by a single person, even within a crowded work area.

22 Claims, 4 Drawing Sheets

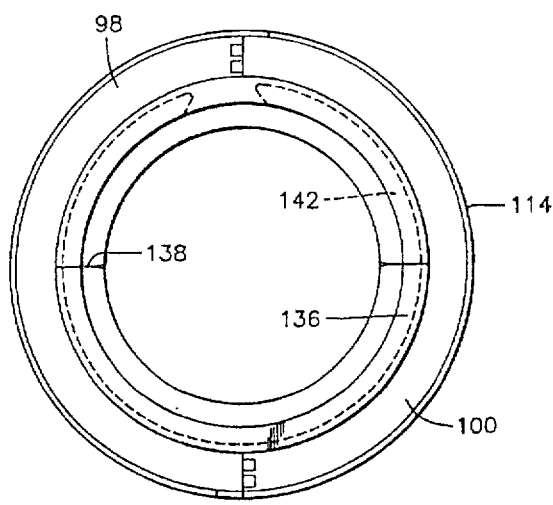
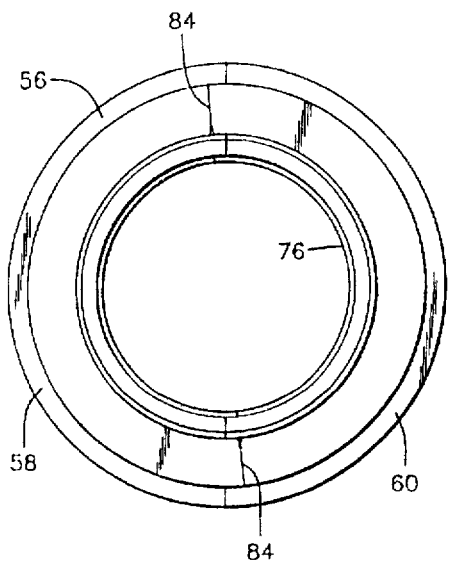
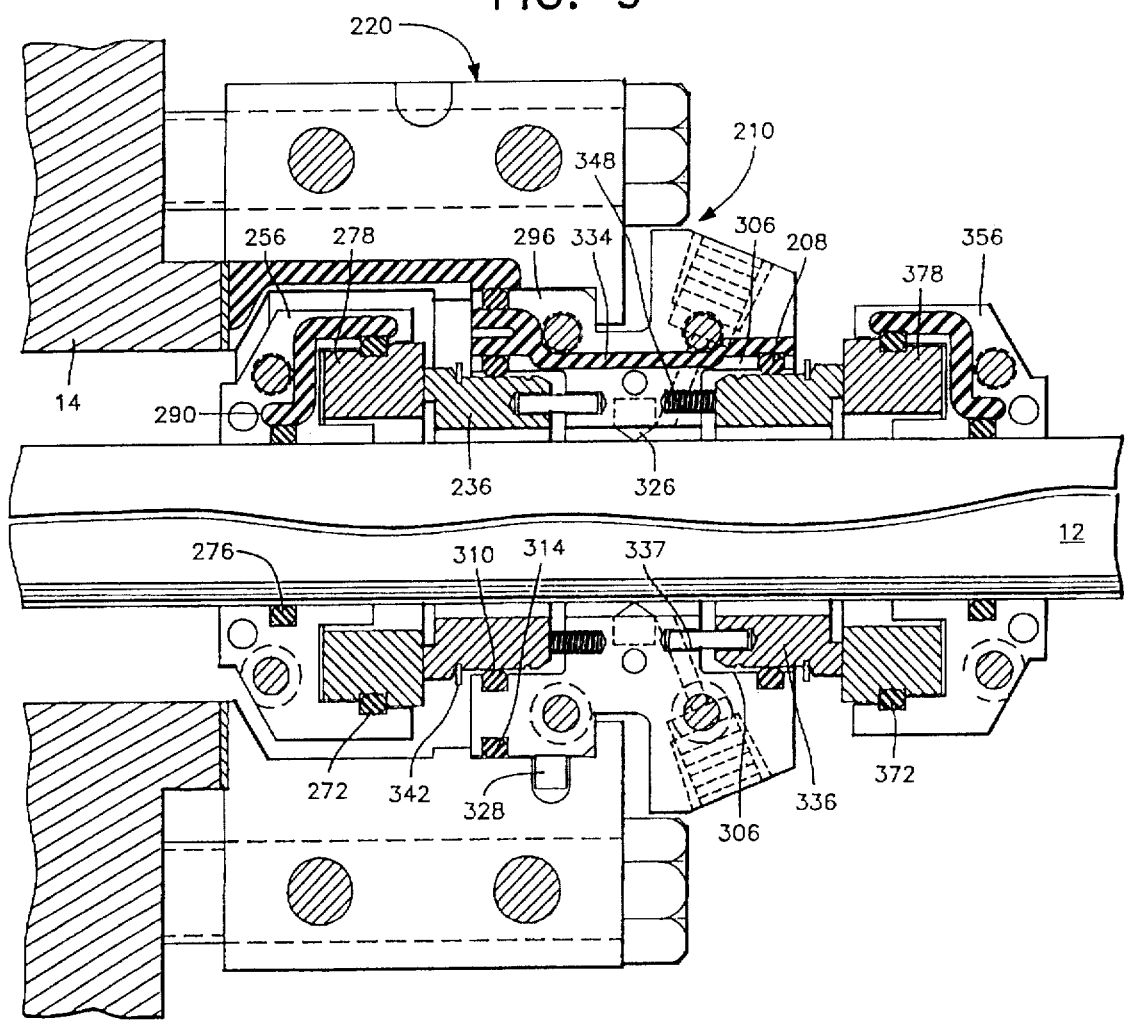

5,716,054

DIAMETRIC PLANE SPLIT MECHANICAL FACE SEAL

This application is a continuation, of application number 08/374,325 filed Jan. 18, 1995, now abandoned.

BACKGROUND OF THE INVENTION

1. Field of the Invention

This invention relates to a shaft seal of the mechanical face seal type, split along a diametric plane thereof and which therefore can be installed relative to a shaft without disassembly of attendant equipment. The stationary and rotating components of the seal may be independently assembled about an attendant shaft, axially displaced toward each other as independent assembled units and then received within axially spaced inwardly opening recesses provided in a diametric plane split gland assembly.

2. Description of Related Art

Various different forms of seals including some of the general structural and operational features of the instant invention are disclosed in U.S. Pat. Nos. 4,538,820, 4,576,384 and 5,294,132. However, these previously known devices do not include the overall combination of structural and operational features incorporated in the instant invention. In addition, various other forms of sealing devices have been used between stationary housing members and rotating shafts. These other types of devices range from various braided and compressed packings to different types of end face mechanical seals. The end face mechanical seals are generally "leak-free" and are therefore preferred to the braided and compressed packings which usually have a measurable volume of leakage. However, the braided and compressed packings are often used for equipment requiring either a long period of time or special equipment to disassemble, install the mechanical seal and reassemble.

Also, various designs of end face mechanical seals which are split along a diametric plane have previously been offered to allow installation without disassembly of the attendant equipment. The purpose of such devices has been to reduce the leakage associated with the packings. However, the mechanical seal designs offered heretofore have either been very complicated to install or have not appreciably reduced the leakage compared to packings. One problem with most such devices is that they include some type of rotating spring device loading a seal face rotatably opposed to a stationary seal face. The seal faces are typically made of material such as carbon graphite or aluminum oxide (ceramic). The previous designs typically have no viable method to prevent distortion of the stationary face when the two halves of an attendant gland housing are bolted around the seal parts and bolted to the equipment.

SUMMARY OF THE INVENTION

The split mechanical seal of the instant invention incorporates features and benefits heretofore available only in non-split cartridge and semi-cartridge end face mechanical seals. These concepts are disclosed in U.S. Nos. 4,538,820 and 5,294,132 and combine, with additional concepts, to simplify the installation procedures and avoid the problems associated with previous designs of split mechanical seals.

A primary aspect of the instant invention is the incorporation of components to isolate the stationary seal face from the gland housing and to thereby prevent face distortion when the gland housing is bolted around the seal parts and to the equipment housing.

A first component of the instant invention comprises the rotating face seal assembly composed of two symmetrical halves which can be easily fitted around the shaft and releasably mounted in a fixed position by conventional bolting. This first component includes an annular seal face structure (composed of two symmetrical halves) which is loosely supported from a holder, an O-ring (composed of two symmetrical halves) which forms a fluid tight seal between the holder and the shaft, and a second O-ring (composed of two cylindrical halves). The second O-ring forms a fluid tight seal between the holder and the annular seal face structure and automatically centers the annular seal face structure relative to the holder and prevents the annular seal face structure from falling out during assembly or blowing out during operation (by means of appropriate O-ring grooves in both the holder and the annular seal face structure). The first component also includes two or more thin flat gasket sections mounted adjacent the second O-ring and at 90° to the plane wherein the annular seal face structure is split, a flat gasket (composed of two symmetrical halves) mounted behind the annular seal face structure to act as a vibration damper, and two additional flat gaskets to seal the junction of the two halves of the holder and the two O-rings to complete the fluid type seal of this first component.

A second component of the instant invention comprises the stationary face assembly to be securing in position relative to the equipment housing by means of a third component, a split seal gland housing. This stationary face assembly includes a centering bushing, composed of two symmetrical halves, whereby the stationary face assembly is automatically centered concentric with the associated rotating shaft. Furthermore, the stationary face assembly includes an annular seal face, also composed of two symmetrical halves loosely telescoped within one end of an annular gland insert or holder, also composed of two symmetrical halves, and from which a second annular seal face structure is supported opposing the first mentioned annular seal face.

This second annular seal face structure is keyed to the annular gland insert for guided axial shifting relative thereto and is supported from the annular gland insert in fluid tight sealed engagement therewith in a manner allowing axial shifting of the seal face structure relative to the annular gland insert and also centering the seal face structure relative to the annular gland insert. This arrangement ensures that the seal face structure and annular gland insert are both properly centered relative to the associated rotating shaft.

The second annular seal face structure is releasably held together by a snap ring of specific dimension and with ends formed such as to avoid scoring the outside diameter of the second annular seal face structure. The second annular seal face structure is also supported by an O-ring, composed of two symmetrical halves, which forms a fluid tight seal between the second annular seal face structure and the annular gland insert.

An additional O-ring, also composed of two symmetrical halves, forms a fluid tight seal between the annular gland insert and the split gland housing. Two U-shaped flat gaskets seal both the injunction of the two halves of the annular gland insert and the two O-rings to complete the fluid tight seal of this second assembly. These gaskets are U-shaped in order to be hydraulically activated by the pressure of the fluid being sealed. This U-shaped design provides rigidity for sealing against the two O-rings without creating a high load on the O-ring which seals against the stationary annular seal face structure. This latter O-ring must allow the stationary annular seal face structure to axially shift so as to compensate for axial movement of the associated rotating shaft. It should be noted that the spring device, or devices, are located in this stationary assembly and provide an axial force to the second annular seal face structure opposing the first mentioned annular seal face structure.

After the first mentioned component, or rotating face seal assembly, is assembled and secured into position on the associated shaft, the second mentioned component, or stationary face assembly, is assembled to the associated shaft adjacent the first mentioned component, with the annular seal face structures in loose contact opposing one another. The third component comprising the split seal gland housing, composed of two identical halves, one half positioned 180° radially around the associated shaft with respect to the other half, is then secured in position. The split seal gland housing covers and secures the first and second components relative to one another as the second stationary component is axially shifted, against the biasing action of the aforementioned spring devices, into closer axial position relative to the first mentioned seal face structure. In this manner, as the two halves of the split seal gland housing are assembled about the first and second seal components or assemblies, the seal assemblies are shifted only axially relative to each other and do not experience any relative radial shifting.

A key is provided between the annular gland insert or holder and the split seal gland housing to properly position the components relative to one another. The gland housing halves are then bolted together by conventional bolting. Two identical flat gaskets form a fluid tight seal between both of the two halves of the gland housing and the outer O-ring of the annular gland insert. Conventional gland bolting on the associated equipment housings are tightened against the split seal gland housing in order to draw both the properly centered gland housing and annular gland insert into tight sealed engagement with the equipment housing portion and the first mentioned annular seal face, respectively. A flat gasket, composed of two symmetrical halves or a single flexible strip of conventional soft gasket material, serves to form a fluid tight seal between the split gland housing and the equipment housing portion. Thus, any uneven tightening of the gland bolting or any resulting distortion of the gland housing remains independent of proper alignment of the two mentioned annular seal face structures.

The main object of this invention is to provide an axially split end face mechanical seal including the advantages of a stationary spring cartridge-type seal, but which utilizes components which can be assembled onto and around an associated rotatable shaft without disassembling the associated equipment.

Another very important object of this invention is to provide a split seal including the advantages of a semi-cartridge seal which enables installation of the seal structure in a manner such that the tightening of the gland housing does not deform the supporting and sealing parts of the seal and which thereby provides a seal which may be operated at higher pressures and without leakage associated with previously axially split mechanical seals.

Still another object of this invention is to provide a split seal incorporating components which can be installed reliably and be visually observed after they are assembled onto and around an associated rotating shaft to determine that proper assembly has been performed and the respective halves of the two annular seal face structures are indeed properly aligned.

Another very important object of this invention is to provide a split seal incorporating components which can be installed easily with simplified procedures and prevent installation errors.

Still another very important of this invention is to provide a dual seal embodiment which can be constructed either as a double seal or as a tandem seal for applications wherein a single seal is not appropriate.

A final object of this invention to be specifically recited herein is to provide a split seal in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, referenced being had to the accompanying drawings forming a part hereof, wherein like numerals refer to like parts throughout.

BRIEF DESCRIPTION OF THE DRAWINGS

FIG. 5 is an inside end elevational view of the stationary seal component of the assembly shown in FIG. 1.

FIG. 6 is an outside end elevational view of the rotary seal component of the assembly shown in FIG. 1.

FIG. 9 is a fragmentary longitudinal vertical sectional view similar to FIG. 1 but illustrating a modified double or tandem seal form of the instant invention.

DESCRIPTION OF THE PREFERRED EMBODIMENTS

Figure 1:
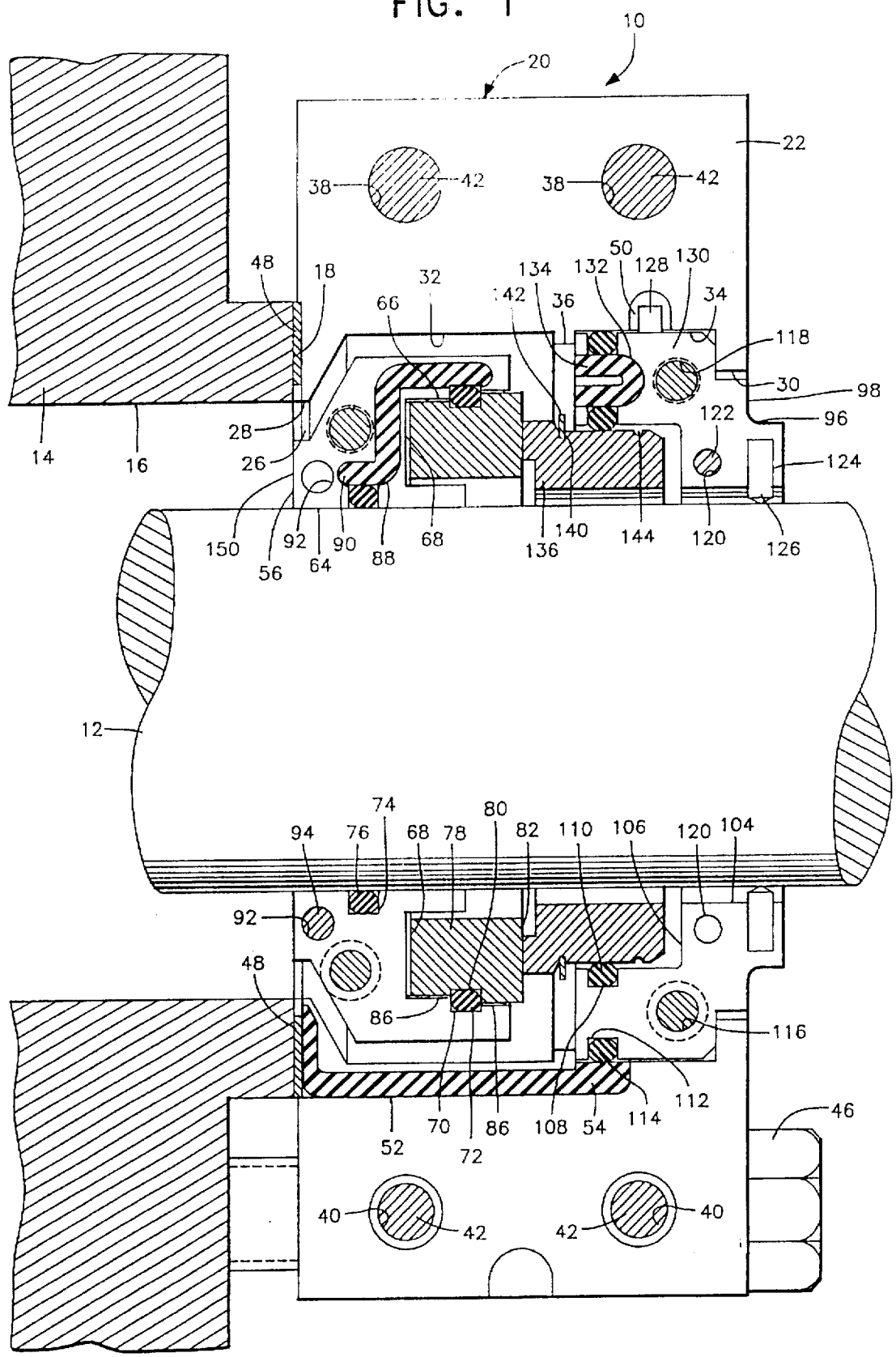
FIG. 1 is a vertical sectional view taken substantially upon a plane passing through the longitudinal center line of a first form of the preferred split seal assembly constructed in accordance with the present invention.

Referring now more specifically to FIGS. 1–8, the numeral 10 generally designates a first form of the preferred split seal assembly in accordance with the present invention, utilized in conjunction with a rotary shaft 12 and a stationary housing portion 14. The housing portion 14 defines an opening 16 therein through which the shaft 12 projects and which opens through a seal face 18 extending about the opening 16. A split gland housing referred to generally by the reference numeral 20 is provided and includes two preferably identical halves 22 and 24 defining an opening 26 therethrough of a first small diameter as at 28 on the inner end thereof and a second large diameter as at 30 on the outer end thereof. The housing 20 defines first and second axially spaced inner and outer end annular recesses 32 and 34 spaced inwardly from the opposite axial ends of the opening 26 and separated axially by an annular rib portion 36.

Figure 2:
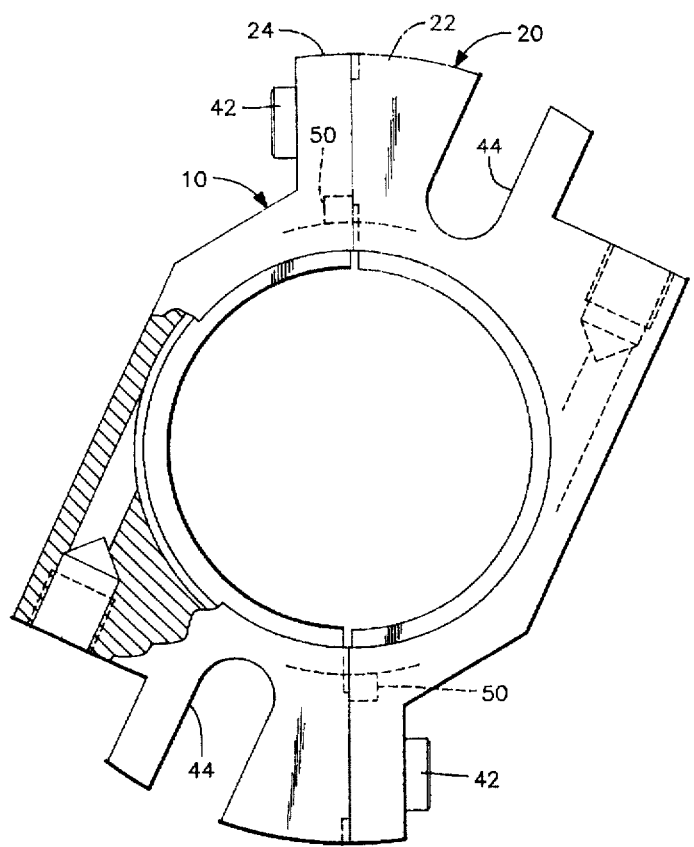
FIG. 2 is an outside axial end elevational view of the split gland housing of the instant invention as shown in FIG. 1 with portions thereof broken away and illustrated in vertical section.
Figure 3:
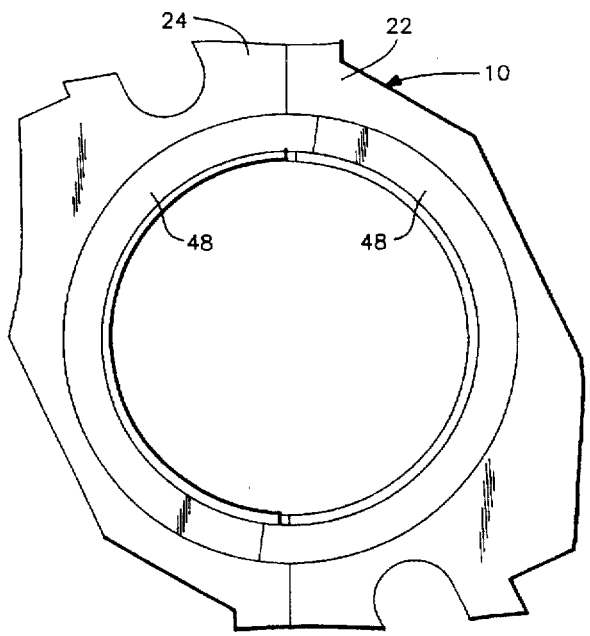
FIG. 3 is a fragmentary inside elevational view of the split gland housing of the assembly shown in FIG. 1.

The halves 22 and 24 each include a pair of smooth bores 38 and a pair of threaded bores 41 equipped with counterbores 42. As shown in FIG. 2, shouldered bolts 42 are utilized to tightly secure the halves 22 and 24 together. The halves 22 and 24 further include mounting slots 44 by which mounting bolts 46 may be used to tightly clamp the assembled housing 20 to the stationary housing portion 14, and diametrically split seal halves 48 are clamped between the stationary housing portion 14 and the assembled split gland housing 20. In addition, each housing half 22 and 24 includes a recess 50 which opens through one radial mounting face thereof, only one of the recesses 50 being utilized in a manner to be hereinafter more fully set forth. Still further, the other radial mounting face of each housing half 22 and 24 includes an L-shaped relieved area 52 in which a similar L-shaped flat seal 54 is partially recessed for compressive sealing between the halves 22 and 24 when the latter are bolted together through the utilization of the bolts 42.

Figure 8:
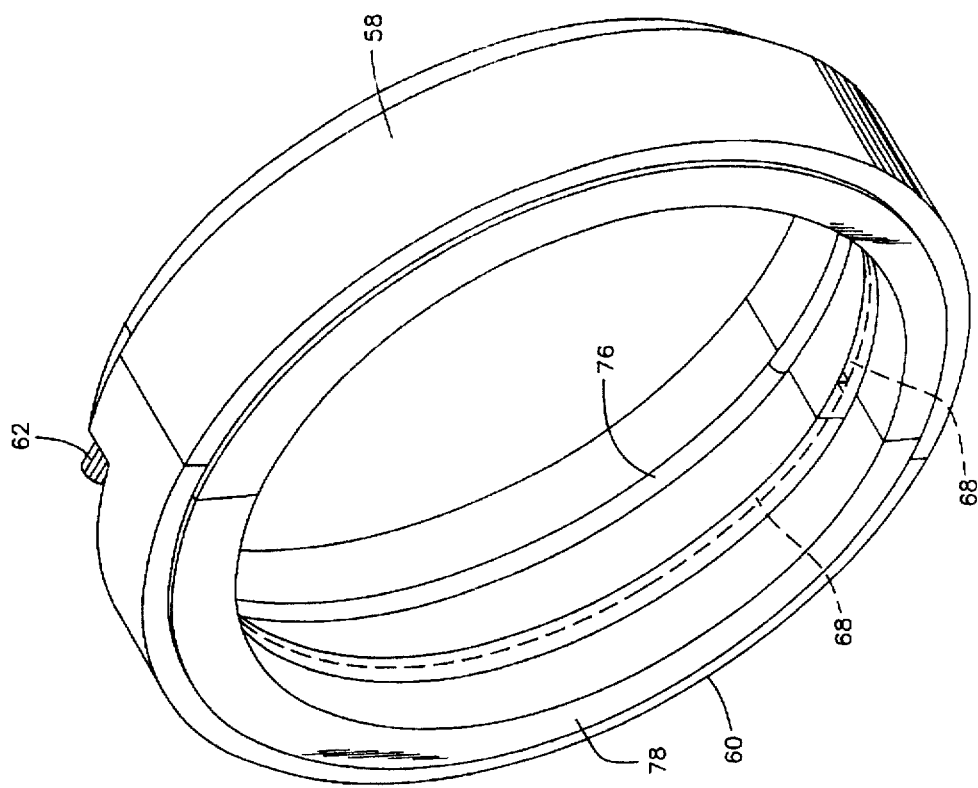
FIG. 8 is an outside end perspective view of the stationary seal component of the assembly shown in FIG. 1.

The seal assembly 10 includes a diametrically split first seal face holder 56 comprising a pair of identical holder halves 58 and 60 removably circumferentially joined together through the utilization of a pair of bolts 62 similar to bolts 42, as shown in FIG. 8. The holder 56 defines a bore 64 formed therethrough for tight clamping engagement with the shaft 12 and further defines an outer end counterbore 66 in which a pair of one half annular, compressible and non-resilient vibration dampening strips 68 are seated. In addition, the holder 56 further defines an inwardly opening circumferential groove 70 in which a diametrically split O-ring seal 72 is partially seated. The holder 56 also defines a radially inwardly circumferential groove 74 opening into the bore 64 and in which a diametrically split O-ring seal 76 is compressively seated by the shaft 12 in order to form a fluid tight seal between the shaft 12 and the holder 56.

A diametrically split rotary seal face 78 is snugly received within the counterbore 66 and includes an outer circumferential groove 80 in which the O-ring seal 72 also is compressively seated. Further, the rotary seal face 78 is seated against the vibration dampening strips 68, and the seal face 78 includes a sealing surface 82 normal to the center axis of the shaft 12.

The seal face 78 is originally constructed of one piece and diametrically fractured as at 84, see FIG. 6. The O-ring 72 not only seals the seal face 78 relative to the holder 56 but also locks the rotary seal face within the counterbore 66 against more than minimal axial shifting therein.

As the seal face halves 78 are installed within the halves 58 and 60 of the holder 56, thin resilient strips 86 are interposed between the walls of the counterbore 66 and the outer peripheral portions of the halves of the rotary seal face 78 on either side of the circumferential groove 80, see FIG. 1. These strips 86 are mounted perpendicularly to the diametric plane along which the rotary seal face is fractured and the halves of the O-ring seals 72 and 76 are slightly offset circumferentially from the diametric mating surfaces of the seal face holder 56. The diametric plane in which the rotary seal face 78 is fractured is also oppositely offset annularly relative to the diametric plane of the mating surfaces of the holder halves 58 and 60. Thus, it may be seen that the first seal face holder 56 may have the components of each half thereof relatively assembled and then the two halves 58 and 60 may be engaged about the shaft 12 and joined through utilization of the bolts 62. One mating surface of each half 58 and 60 includes a generally Z-shaped recess 88 formed therein in which a flat similarly Z-shaped compressible gasket 90 is seated whereby the mating faces of the halves 58 and 60 are sealed relative to each other. Further, it will be noted that the gaskets 90 are each sealed relative to the O-ring seals 72 and 76. In addition, each half 58 and 60 includes a bore 92 formed therein opening outwardly of the mating surface thereof, and one of the bores 92 has a positioning pin 94 seated therein and projecting outwardly therefrom for reception within the opposing bore 92.

Figure 4:
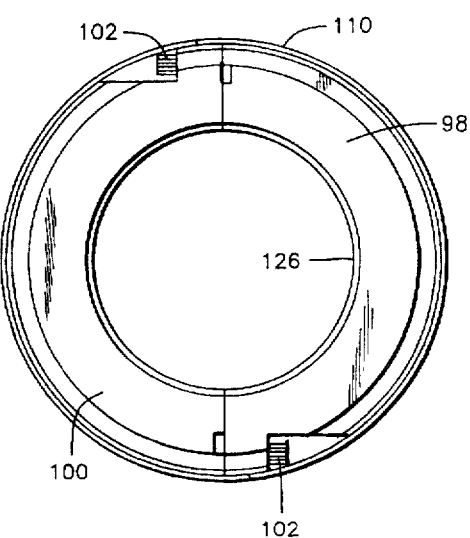
FIG. 4 is an outside end elevational view of the stationary seal components of the assembly shown in FIG. 1.
Figure 7:
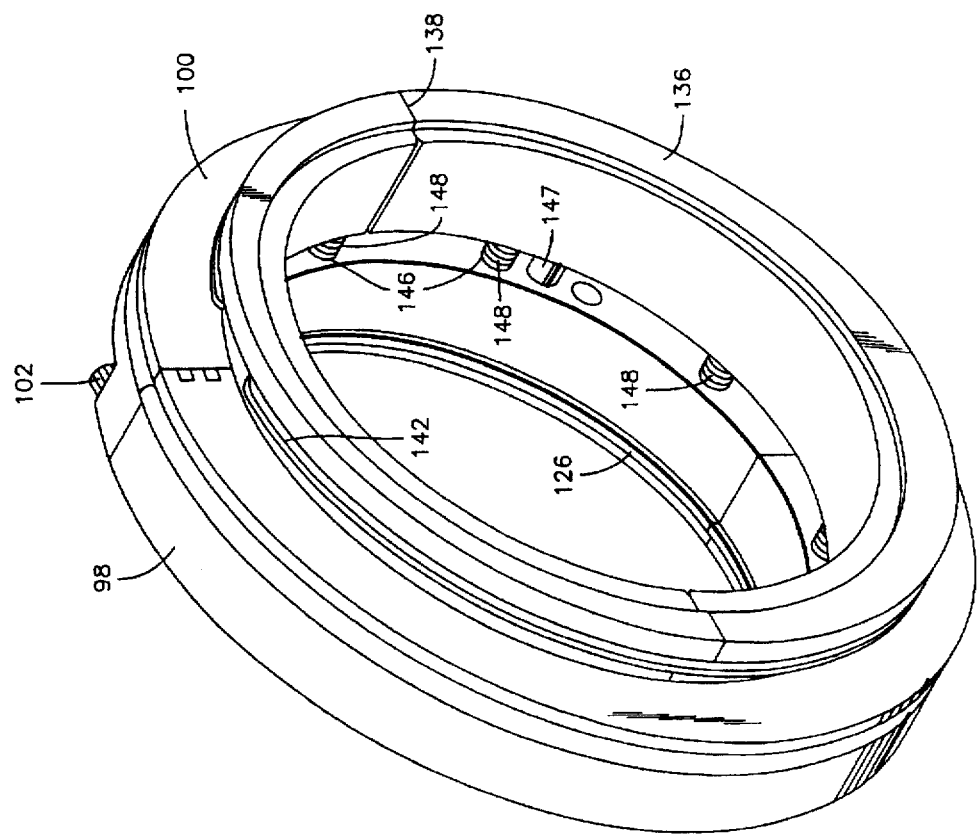
FIG. 7 is an inside end perspective view of the stationary seal component of the assembly shown in FIG. 1.

The split seal assembly 10 further includes a second seal face holder 96 which is annular and diametrically split to form a pair of holder halves 98 and 100 removably circumferentially joined together through the utilization of a pair of bolts 102 corresponding to the bolts 62 and 42, as shown in FIGS. 4 and 7. The halves 98 and 100 define a bore 104 formed therethrough including an inner end counterbore 106. The counterbore 106 includes a circumferential inwardly opening groove 108 in which a diametrically split O-ring 110 is partially received. Further, the outer periphery of the holder 96 defines an outer peripheral groove 112 in which a diametrically split O-ring 114 is partially received. The halves 98 and 100 preferably are identically formed and each includes a smooth bore 116 and a threaded bore 118 through which and in which the bolts 102 are received and threadedly engaged for securing the halves 98 and 100 together. In addition, each half 98 and 100 includes a bore 120 opening outwardly through the mating face thereof and one of the bores 120 includes a positioning pin 122 seated therein and projecting outwardly therefrom for keying engagement in the other positioning bore 120.

Also, the holder 96 defines an inner circumferential groove 124 opening into the bore 104 and in which a diametrically split carbon centering bushing 126 is seated. The centering bushing includes an inner periphery having a diameter substantially equal to the diameter of the shaft 12. The holder half 98 includes a radially outwardly projecting locator pin 128 receivable within the recess 50, and each of the sealing surfaces 130 of the halves 98 and 100 includes a U-shaped relieved area in which a flat, resilient and U-shaped flat seal 134 is partially seated.

A stationary seal face 136 is provided. The seal face 136 is originally constructed in annular form, but is fractured along a diametric plane as at 138. The seal face 136 includes a narrow outer peripheral groove 140 in which a narrow snap ring 142 is seated in order to releasably secure the seal halves together to form the unitary seal face 136. The outer periphery of the seal face 136 additionally includes a second annular groove 144 for a purpose to be hereinafter more fully set forth.

Each of the holder halves 98 and 100 includes a plurality of circumferentially spaced blind bores 146 opening into the counterbore 106 and having corresponding ends of a plurality of expansion springs 148 seated therein. Further, one of the halves 98 and 100 includes a positioning pin 147 projecting outwardly therefrom and loosely slidably received in an opposing blind bore (not shown) formed in the seal face 136 to thereby key the seal face 136 and the holder 96 against relative rotation. See FIG. 7. The seal face 136 initially is snugly received within the counterbore 106 to an extent with the O-ring 110 having its inner periphery removably seated in the groove 144 to thereby yieldably prevent relative axial shifting between the seal face 136 and the holder 96.

It may be seen that the O-ring 110 provides a seal between the stationary seal face 136 and the holder 96, that the U-shaped flat seal 134 forms a seal between the O-ring 110 and the O-ring 114 and that the O-ring 114 forms a seal between the holder 96 and the housing 20. Furthermore, the O-ring 114 seals relative to the flat seal 54, and the spacing between the legs of the flat seal 134 comprises spacing for expansion of the legs of the flat seal 134 independent of deflection of the contacting portions of the O-rings 110 and 114 when the halves 98 and 100 are tightly bolted together about the shaft 12.

When installing the split seal assembly, the halves 58 and 60 of the first seal face holder 56 have their corresponding components 68, 72, 76, 78, 86 and 90 secured together and each of the halves 58 and 60 is separately engaged about a corresponding side of the shaft 12. Thereafter, the holder 56 is properly positioned along the shaft 12 with the inner end face 150 thereof registered with the seal face 18 of the housing portion 14 and the bolts 62 are then tightened. The two halves of the seal face 136 are then assembled loosely about the shaft 12 and the snap ring 142 is seated in the groove 140 in order to maintain the two halves of the stationary seal face secured together about the shaft 12.

Next, the two halves 98 and 100 of the second seal face holder 62 have the corresponding components 110, 114, 126, 134 and 148 assembled and the two halves 98 and 100 are loosely positioned about the shaft 12 and secured together through the utilization of the bolts 102 with the holder 96 axially spaced from the stationary seal face 136 and the latter axially spaced from the rotating seal face 78. Then, after the bolts 102 have been properly tightened, the holder 96 is axially shifted toward the stationary seal face 136 such that the latter is loosely received in the counterbore 106 to a position with the springs 148 only slightly tensioned and the O-ring 110 seated in the groove 144 to thereby assemble the holder 96 and the stationary seal face 136 together as a unitary structure loosely disposed about the shaft 12 but centered relative thereto through the utilization of the centering bushing 126. The assembled holder 96 and stationary seal face 136 are then axially shifted toward the holder 56 and the rotary seal face 78 in order to engage the stationary seal face 136 with the seal face 78. Movement of the holder 98 toward the holder 56 is continued while the springs 148 are compressed until the holders 56 and 96 and seal faces 78 and 136 are positioned as illustrated in FIG. 1. Then, the housing half 22 is engaged about the holders 56 and 96 with the locator pin 128 received in the recess 50 and the half 22 tightly abutted against the corresponding seal half 48. Thereafter, the second housing half 24 is engaged over the sides of the holders 56 and 96 opposite the half 22 and the bolts 42 are inserted and tightened.

As a result of the interlocking engagement of the rotary seal face halves within the halves of the holder 56 and the seal face 136 being yieldably secured within the holder 96, the entire assembly of the split seal assembly 10 may be carried out by a single work person, even when working in a confined area.

After the housing halves 22 and 24 have been tightly bolted together through the utilization of the four bolts 42, the mounting bolts 46 may be received through the mounting slots 144 and tightened securely within the stationary housing portion 14. The tightening of the bolts 46 serves to tightly compress the seal halves 48 between the housing portion 14, and the split gland housing comprises the housing halves 22 and 24.

The diametric planes in which the ends of the O-rings 110 and 114 are disposed are slightly displaced angularly relative to the diametric plane in which the sealing surfaces 130 are contained. In addition, the diametric plane in which the opposing ends of the split centering bushing 126 are disposed is also slightly displaced angularly relative to the diametric plane of the sealing surfaces 130.

The O-rings 76 seal the holder 56 relative to the shaft 12 and the O-ring 72 seals the holder 56 relative to the rotary seal face 78, the flat gaskets 90 sealings the halves 58 and 60 relative to the O-rings 76 and 72. Further, the flat gasket or seal 134 also forms a seal between the O-rings 110 and 114.

With attention now invited more specifically to FIG. 9, a modified form of split seal assembly 210 is illustrated including a holder 256 corresponding to the holder 56, a first rotary seal face 278 corresponding to the rotary seal face 78, a stationary seal face holder 296 corresponding to the seal face holder 96 and a stationary seal face 336 corresponding to the seal face 136.

An attendant split gland housing 220 corresponding to the housing 20 is provided and various components of the split seal assembly 210 corresponding to the various components of the assembly 10 are designated by corresponding reference numerals in the 200 and 300 series, i.e. corresponding components are identified by numerals which differ by 200. The basic difference between the seal assembly 210 and the seal assembly 10 is that the second seal face holder 296 is double ended and includes a second counterbore 306 on its outer end in which a second stationary seal face 336 corresponding to the seal face 136 is recessed, the seal face 336 being keyed to the seal face holder 296 through the use of a positioning pin 337. The second stationary seal face 336 is yieldingly biased outwardly of the counterbore 306 through the utilization of circumferentially spaced compression springs 348 corresponding to the compression springs 148, and the stationary seal face 336 is sealed relative to the outer end of the holder 296 through the utilization of an O-ring 208.

Opposing the outer end of the stationary seal face 336 is a second seal face holder 356 supporting a second rotary seal face 278 supported from and in operative association with the holder 356 in substantially the same manner in which the seal face 78 is supported from the holder 56. Of course, the second rotary holder 356 is clamped about the shaft 12, and the holder 296 includes a location pin 328 keyed to the housing 220. Also, the seal assembly 210 includes a pair of flat seals 334 whose inner ends comprise substantially duplicates of the flat seals 134, but whose outer ends are elongated longitudinally of the holder 296 and coact with the outer O-ring 208.

After the inner rotating seal face holder 256 and the outer stationary seal holder 296 and stationary face 336 have been assembled relative to each other, and the housing 220 has been bolted to the stationary housing portion 14 as shown in FIG. 9, the second stationary seal face 336 may be assembled about the shaft 12 and the second seal face holder 356 and rotary seal face 278 may be assembled about the shaft 12 and relative to each other. Then, before tightening the clamping screws of the holder 356, the second stationary seal face is engaged in the outer counterbore 306 of the holder 296. The holder 356 is then axially shifted along the shaft 12 toward engagement with the second stationary seal face 336 to shift the latter further into the counterbore 306 against the biasing action of the compression springs 348 before tightening the mounting bolts of the second rotary seal face holder 56 to clamp the latter upon the shaft 12 for rotation therewith. Thus, it may be seen that by rendering the holder 296 double ended and providing a second stationary seal face 336 corresponding to the seal face 236 and also a second rotary seal face 378, a double or tandem seal may be achieved.

If it is desired, the split seal assembly 220 illustrated in FIG. 9 may be mounted relative to the shaft 12 in the housing portion 14 independent of the second stationary seal face 336 and the second rotary seal face 378 and its holder 356. Then, if it subsequently appears necessary, the second stationary seal face 336 and second rotary seal face 378 and attendant holder 356 may be installed.

The seal faces 78, 136, 278, 236, 336 and 378 are preferably made of material such as carbon graphite or aluminum oxide (ceramic). The centering bushings 126 and 326 are preferably constructed of carbon and each of the O-rings may be constructed of a suitable O-ring material according to the temperature of the working environment and fluids to be sealed.

The O-ring 72 as well as the O-rings 272 and 372 perform not only sealing functions but also serve to center the corresponding seal face members into position coaxial with the attendant holders and the shaft 12. Further, these O-rings also serve to frictionally resist rotation of the corresponding seal face members in the counterbores in which they are received.

It is also noted that the resilient strips 86 as well as corresponding resilient strips provided for the rotating seal faces 278 and 378 are typically 0.007 inch thick and are mounted in planes disposed generally normal to the planes containing the fractured end faces of the halves of the corresponding rotary seal face 78. These strips are somewhat resilient, but are primarily compressible to maintain the fractured end faces of the seal face in sealed engagement with each other. Further, the vibration dampening strips 68 and similar strips used in conjunction with the seal face 378 are somewhat compressible, but non-resilient and are utilized as dampening strips to eliminate vibration of the seal faces 78, 278 and 378.

The groove 144 and similar grooves formed in the seal faces 236 and 336 are provided to resiliently maintain the seal faces 136, 236 and 336 properly centered and contained within the corresponding holders during relative axial shifting between the holders and the stationary seal faces 78, 278 and 378 throughout the final stages of installation of the split seal assemblies.

It is to be noted further that the mating surfaces of the holder halves are disposed in diametric planes disposed substantially normal to the mating surfaces of the corresponding split gland housing halves. This fact coupled with the use of the relatively soft seal half strips 48 insures that even if the mounting bolts 46 mounting the split gland housing to the stationary housing portion are unevenly tightened, proper alignment of the rotary and stationary seal faces is maintained. This of course also applies to the seal assembly illustrated in FIG. 9.

In addition to the disclosed seal assemblies 10 and 210 being constructed in a manner enabling their installation by a single work person even in a confined area, the seal assemblies are constructed such that they can be installed reliably and be visually observed after assembly onto and around an associated shaft to determine that proper assembly has been performed.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. A split seal construction including relatively axially displaced rotating and stationary seal assemblies incorporating annular holders each including a pair of substantially half annular segments, said holders having opposing and remote axial ends, said opposing ends defining counterbores formed therein, substantially diametrically split rotating and stationary annular seal faces each formed from two halves received in said counterbores of said rotating and stationary annular holders, respectively, substantially diametrically split ring means in said rotating holder counterbore interlocking said rotating seal face and rotating holder against axial separation while allowing limited relative axial displacement therebetween, spring means in said stationary holder yieldingly biasing the stationary annular seal face outwardly of the stationary holder counterbore, and resilient split seal means yieldingly limiting relative axial separation of said stationary seal face and said stationary holder and sealing the outer periphery of said stationary seal face relative to the stationary holder counterbore, wherein said rotating seal face has radially inner and outer annular peripheries and wherein the counterbore of said rotating holder for said rotating seal face has first and second annular surfaces, the first annular surface disposed radially inward and in opposed relation to the inner annular periphery of said rotating seal face and the second annular surface disposed radially outward and in opposed relation to the outer annular periphery of said rotating seal face, and wherein said split ring means interlocking said rotating seal face and said rotating holder against axial separation comprises a split O-ring seal, said counterbore of said rotating holder and the outer periphery of said rotating seal face including opposing radially inwardly and radially outwardly opening, respectively, circumferential grooves formed therein in which said split O-ring seal is seated.

2. The split seal construction of claim 1 wherein said remote end of said stationary holder includes a split inner periphery centering bushing adapted to center said stationary holder relative to a rotating shaft upon which said rotary seal assembly is stationarily mounted.

3. The split seal construction of claim 1 wherein said remote end of said rotating holder includes a split inner periphery annular seal for forming a fluid tight seal with a shaft upon which said rotating holder is mounted.

4. A split mechanical face seal including a pair of axially spaced split ring holders each having opposing and remote axial ends, said opposing ends defining counterbores formed therein, a pair of split ring seal face structures received in said counterbores and including opposing contacting seal surfaces, a pair of resilient mounting means mounting said seal face structures in said counterbores and biasing said seal face structures toward coaxial positions in said counterbores, said mounting means at least yieldingly keying said seal face structures within said counterbores against axial withdrawal therefrom and a gland housing for securement to a stationary housing outwardly from which a rotating shaft projects, said holders each extending about said shaft, said gland housing defining a bore formed therethrough receiving said shaft therethrough and incorporating generally C-shaped housing halves joined together, said bore including a pair of axially spaced, diametrically enlarged bore portions spaced inward from the opposite ends of said bore, one of said holders being snugly axially received in one of said enlarged bore portions and the other holder being loosely axially received in the other of said enlarged bore portions.

5. The split mechanical face seal of claim 4, wherein said remote end of one of said holders includes a split inner periphery centering bushing adapted to contact a rotating shaft to center said one of said holders relative to the shaft.

6. The split mechanical face seal of claim 4, further comprising a seal means that forms a seal between the gland housing and one of said holders and further comprising a gasket means that forms a seal between and is in contacting relation with both the seal means and the mounting means associated with the one of said holders.

7. The split mechanical face seal of claim 6, wherein the gasket is U-shaped including two spaced legs, wherein the spacing between the legs communicates with a pressurized fluid during operation.

8. The split mechanical face seal of claim 4, further comprising:
   a key between the gland housing and one of said holders to properly position the gland housing and one of said holders relative to one another;
   wherein the holders each include a pair of removably joined substantially half annular segments having opposed mating surfaces; and
   wherein the mating surfaces of the one of said holder halves are disposed in diametric planes disposed substantially normal to mating surfaces of the gland housing.

9. The split mechanical face seal of claim 4, further comprising a snap ring, wherein the seal face structures are each substantially diametrically split to form two halves, and wherein one of said annular seal face structures includes a first outer peripheral groove for receiving the snap ring thereby releasably securing the halves of the one of said annular seal face structures together.

10. The split mechanical face seal of claim 9, wherein the one of said annular seal face structures includes a second outer peripheral groove for seating the mounting means during assembly of the one of said annular seal face structures and its respective holder.

11. A split mechanical face seal assembly, comprising:
   rotating and stationary axially spaced split ring holders, each holder having opposing and remote axial ends, said opposing ends defining counterbores formed therein;
   split rotating and stationary ring seal faces received in said counterbores of the rotating and stationary holders, respectively, and including opposing contacting seal surfaces;
   resilient rotating and stationary mounting means mounting said seal faces in said counterbores of the rotating and stationary holders, respectively, and biasing said seal faces toward coaxial positions in said counterbores; and
   a split inner periphery annular seal separate from said rotating mounting means and engaging the rotating holder for forming a fluid tight seal with a shaft upon which said rotating holder is mounted;
   wherein one of said rotating and stationary seal faces has inner and outer annular peripheries and wherein the counterbore of said respective holder for said one of said rotating and stationary seal faces has first and second annular surfaces, the first annular surface disposed radially inward and in opposed relation to the inner annular periphery of the one of said rotating and stationary seal faces and the second annular surface disposed radially outward and in opposed relation to the outer annular periphery of the one of said rotating and stationary seal faces; and
   wherein said one of said rotating and stationary seal faces and its respective holder have opposed annular grooves that are axially aligned for receiving the respective mounting means therein, each of said grooves configured to contact the respective mounting means on axially opposite sides thereof, thereby locking said one of said rotating and stationary seal faces within its respective counterbore.

12. The split mechanical face seal of claim 11, wherein the one of said rotating and stationary seal faces is the rotating seal face and further comprising spring means in the stationary holder biasing the stationary seal face outwardly of the stationary holder counterbore.

13. The split mechanical face seal of claim 11, further comprising a gland housing for securement to a stationary housing outwardly from which a rotating shaft projects, said holders each extending about said shaft, said gland housing defining a bore formed therethrough loosely receiving said shaft therethrough and incorporating generally C-shaped housing halves circumferentially joined together, said bore including a pair of axially spaced, diametrically enlarged bore portions spaced inward from the opposite ends of said bore, one of said holders being snugly axially received in one of said enlarged bore portions and the other holder being loosely axially received in the other of said enlarged bore portions.

14. The split mechanical face seal of claim 13, further comprising a seal means that forms a seal between the gland housing and the stationary holder and further comprising a gasket means that forms a seal between and is in contacting relation with both the seal means and the mounting means associated with the stationary holder.

15. The split mechanical face seal of claim 14, wherein the gasket is U-shaped including two spaced legs, wherein the spacing between the legs communicates with a pressurized fluid during operation.

16. The split mechanical face seal of claim 13, further comprising:
   a key between the gland housing and the stationary holder to properly position the gland housing and the stationary holder relative to one another;
   wherein the holders each include a pair of removably joined substantially half annular segments having opposed mating surfaces; and
   wherein the mating surfaces of the one of said holder halves are disposed in diametric planes disposed substantially normal to mating surfaces of the gland housing.

17. The split mechanical face seal of claim 12 further comprising a snap ring, wherein the seal face structures are each substantially diametrically split to form two halves, and wherein the stationary annular seal face structure includes a first outer peripheral groove for receiving the snap ring thereby releasably securing the half annular segments of the stationary annular seal face structure together.

18. The split mechanical face seal of claim 12 wherein the stationary annular seal face structure includes an outer annular groove for seating the mounting means during assembly of the stationary annular seal face structure and the stationary holder.

19. A split mechanical face seal assembly comprising:
   rotating and stationary axially spaced annular holders each including a pair of substantially half annular segments, said holders having opposing and remote axial ends, said opposing ends defining counterbores formed therein;
   split rotating and stationary annular seal faces received in said counterbores of the rotating and stationary holders, respectively, and including opposing contacting seal surfaces; and resilient rotating and stationary mounting means mounting said annular seal faces in said counterbores of the rotating and stationary holders, respectively;

wherein one of said rotating and stationary axially spaced annular holders and its respective seal face have opposed annular grooves that are axially aligned, the respective mounting means compressively seated in said opposed annular grooves prior to assembly of the half annular segments of said one of said rotating and stationary axially spaced annular holders to each other; and wherein the other of said rotating and stationary axially spaced annular holders includes spring means biasing the respective seal face of said other of said rotating and stationary axially spaced holders outwardly of the respective holder counterbore.

20. The split mechanical face seal assembly of claim 19, wherein the counterbore of said one of said rotating and stationary holders has first and second annular surfaces and wherein the respective seal face for said one of said rotating and stationary holders has inner and outer annular peripheries, the first annular surface disposed radially inward and in opposed relation to the inner annular periphery of said respective seal face and the second annular surface disposed radially outward and in opposed relation to the outer annular periphery of said respective seal face, such that the said respective seal face is snugly received within the counterbore of said one of said rotating and stationary holders.

21. The split mechanical face seal assembly of claim 20 wherein the one of said rotating and stationary holders is the rotating holder.

22. The split mechanical face seal assembly of claim 21 further comprising a separate split inner periphery annular seal engaging the rotating holder for forming a fluid tight seal with a shaft upon which said rotating holder is mounted.

* * * * *